Figure 2:
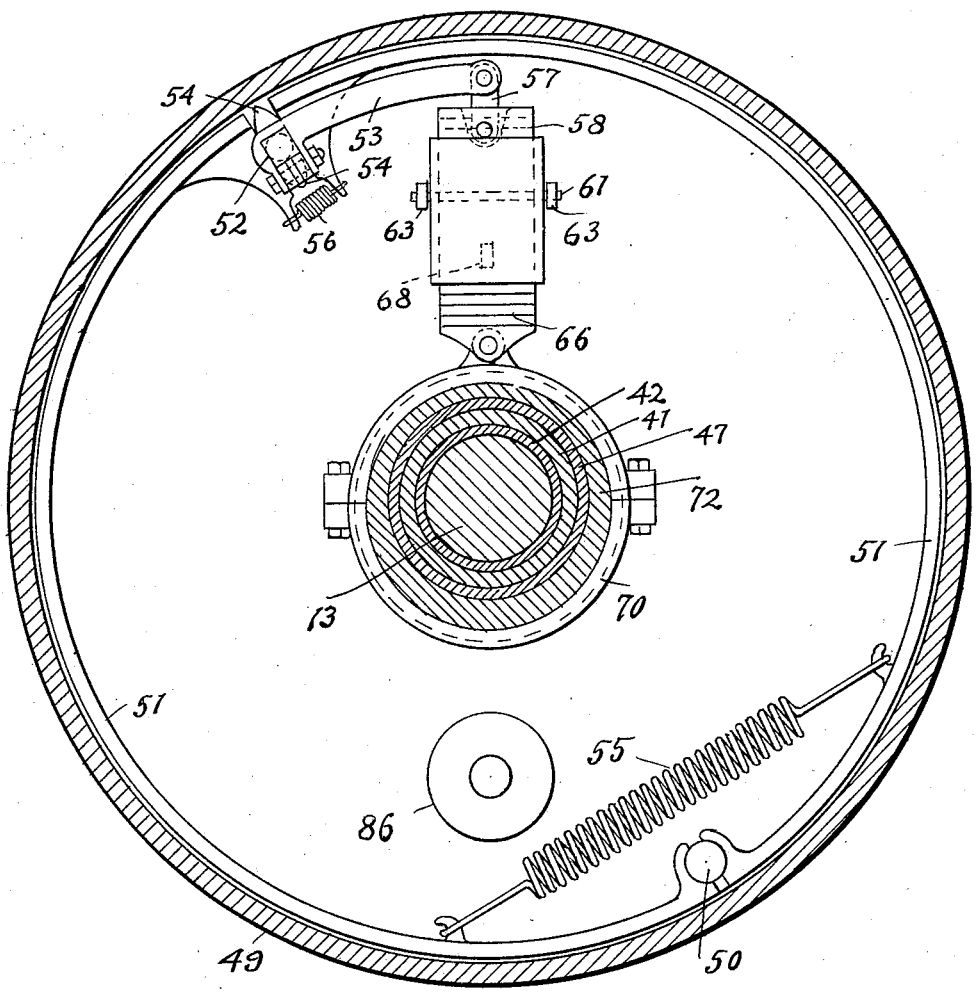

Dec. 1, 1931. W. H. SINGLETON 1,834,259
TRANSMISSION MECHANISM
Filed April 22, 1931 2 Sheets-Sheet 1

Fig. 1.

Inventor
WILLIAM H. SINGLETON
Kwis Hudson & Kent
attys

Patented Dec. 1, 1931

1,834,259

UNITED STATES PATENT OFFICE

WILLIAM H. SINGLETON, OF JERSEY CITY, NEW JERSEY, ASSIGNOR OF ONE-HALF TO CECIL W. COTTON, OF CLEVELAND, OHIO

TRANSMISSION MECHANISM

Application filed April 22, 1931. Serial No. 532,021.

This invention relates to improvements in transmission mechanism for vehicles. It operates upon the slipping clutch principle to provide a comparatively unlimited number of gear ratios, changing automatically as the speed picks up and ending in direct drive as soon as the clutch contact becomes positive.

One of the objects of the invention is the provision of a transmission which shall be simpler in control than the conventional transmission, which may be rendered very quiet by the use of carefully made gears of herring bone or spiral type, wherein the gears are constantly in mesh, and wherein the change of gear ratios is gradual and automatically progresses from low toward high as the load decreases.

Another object is the provision of means for short-circuiting, so to speak, the slipping clutch mechanism for reverse gear, and also when an absolutely positive continuously operating low gear forward is required.

Other objects and features of novelty will appear as I proceed with the description of that embodiment of the invention which, for the purposes of the present application, I have illustrated in the accompanying drawings, in which Figure 1 is a longitudinal, vertical, sectional view of a transmission embodying the invention, and Fig. 2 is a transverse vertical section on the line 2—2 of Fig. 1.

In the drawings the rear extremity of an engine crankshaft is shown at 10. It carries a flange 11 to which is secured a fly-wheel 12. The forward end of a transmission shaft 13 is journaled in a bushing 14 carried centrally in the fly-wheel 12. To this shaft there is secured centrally a spider 15 of a multiple disc clutch. A flange 16 on the fly-wheel carries longitudinal ribs received in peripheral notches of alternate clutch discs. A clutch end plate 17 carries a series of pins 18 working through holes in a cover plate 19 which carries a corresponding number of pairs of ears 20 upon which are pivoted clutch fingers 21 that bear against the outer ends of the pins 18. The inner ends of the fingers 21 are normally pushed forward by a heavy coil spring 22 working through a shift collar 23, which may be moved rearwardly against the action of spring 22 by means of a yoke 24 on a clutch lever 25. While it has been necessary for illustrative purposes to disclose a particular type of clutch, any other type would serve just as well in so far as the present invention is concerned.

The rear end of the spring 22 abuts against a disc 26 which bears at its periphery against the forward surface of a transmission casing 27. This casing may also include a boss 28 in which the pivot for the clutch lever 25 is mounted. The shaft 13 is rotatably supported in the casing 27 by means of a ball-bearing 29, or its equivalent. The rear end of the shaft 13 is rotatably supported in a bushing 30 mounted in a central cavity in the forward end of a propeller shaft 31. This shaft carries a flange 32 to which I bolt a disc 33. The shaft 31 is rotatably supported in the rear wall of the casing 27 by a ball-bearing 34, or otherwise.

Directly in advance of the bushing 30 the shaft 13 has keyed thereto a gear 35 which meshes with a plurality of gears 36, one only shown in the drawing, that are mounted upon stub shafts 37 supported in the disc 33 and evenly spaced along a circle centered in the axis of the shafts 13, 31. One only of these shafts 37 is illustrated in the drawing. Each of the gears 36 is one of a cluster of three, the other gears 38 and 39 being formed integral with the gear 36.

Gear 38 meshes with a gear 40 carried at the rear end of the sleeve 41 which is journaled on a bushing 42 surrounding the shaft 13. Integral with the sleeve 41 there is a disc 43, in the periphery of which are formed teeth or serrations 44. Gear 39 meshes with a gear 45 on the rear extremity of a sleeve 46 that is rotatably mounted upon a bushing 47 surrounding the sleeve 41. The sleeve 46 carries another disc 48 of the same diameter as disc 43 and spaced therefrom. At its periphery the disc 48 carries a brake drum 49 which substantially bridges the space between the discs but clears the disc 43 in order not to interfere with the relative rotation of these two discs.

Mounted in the disc 43 there is a stud 50, (see Fig. 2) which constitutes an anchor for the adjacent ends of two internal brake shoes 51. Diametrically opposite the stud 50 there is a rotatably mounted pin 52 which forms the pivot for an operating lever 53 that carries a pair of cam arms 54 which are adapted to work against abutment surfaces on the free ends of the brake shoes. The lever 53 is shown in Fig. 2 in the inoperative position. The two shoes 51 are held against the stud 50 by a coil spring 55 which also tends to pull the shoes toward inoperative position. A further coil spring 56 connected at its ends to the free ends of the brake shoes also tends to pull the shoes toward inoperative position and returns them to that position when pressure on the lever 53 is removed.

At the outer end of lever 53 there is a link 57 by means of which the lever is connected with the outer extremity of a radially arranged ratchet slide 58. This slide is adapted to move inwardly and outwardly in a guide provided by a boss 59 on the disc 43. On one edge the slide 58 has ratchet teeth which are adapted to engage with ratchet teeth on the corresponding side of the guide. The ratchet surface of the slide is urged toward that of the guide by leaf springs 60. The slide 58 may be moved out of operative engagement with the ratchet teeth on the guide by means of a rod 61 which is received by a slot 62 in the slide. The rod 61 is movable in the boss 59 in a direction at right angles to the direction of the slot 62. This movement is brought about by longitudinally movable rods 63 having eyes surrounding the rod 61 and having at their opposite ends heads 64 which contact with a plate 65 to be referred to presently.

Another ratchet slide 66, with its ratchet teeth facing and adapted to cooperate with the teeth of the slide 58, is guided in the boss 59 and is held toward engagement with the slide 58 by a leaf spring 67. To this slide there is pivoted a rod 68, that extends through a hole in the boss 59 of a size sufficient to provide considerable freedom of movement for the rod 68. This latter rod extends also through the plate 65 and is provided with a head 69 for contact with that plate on the side opposite the heads 64.

The inner end of slide 66 is connected by an articulated joint with a ring 70 that runs upon an eccentric 71 which is carried by an extension 72 of the sleeve 46. Rotation of the sleeve 46 relative to the sleeve 41 therefore imparts reciprocation to the slide 66.

The plate 65, above mentioned, is secured to a grooved collar 73 which is keyed to slide upon an extension 74 of the sleeve 41, and therefore rotates with it. A yoke 75 on the lower extremity of a shift lever 76 extends into the groove of the collar 73 and is adapted to move the plate 65 forwardly or backwardly from the position indicated in Fig. 1.

The disc 48 has a lateral extension at its periphery in which are formed teeth or serrations 77 similar to the teeth or serrations 74. Dogs 78 and 79 are adapted to be projected downwardly one at a time so as to engage between adjacent teeth in the discs 43 and 48 respectively. These dogs are normally held in inoperative positions by coil springs 80 and 81 working against the opposite arms of a lever 82 which is pivoted centrally upon a boss 83 carried upon the top of the casing. The lever 82 may have an operating handle 84, by means of which one or the other of the dogs 78, 79 may be depressed and caused to engage and hold motionless one or the other of the discs 43 and 48. Upon the disc 43 opposite the boss 59 I may mount a weight 86 as a counterbalance.

*Operation.*—Assuming that a vehicle in which my transmission is employed is standing still with the engine idling, the lever 76 being then in a position to hold the collar 73 to the rear of the position indicated in Fig. 1, the plate 65 having acted through the heads 64 on the rods 63 to push the ratchet slide 58 out of engagement with the ratchet teeth on the boss 59. At this time the gear 35 is rotating and is transmitting rotation to the cluster gears, which are in turn rotating gears 40 and 45 at different speeds. The discs 43 and 48 are thereby being rotated independently of each other at different speeds in the same direction. The disc 33 is being held against rotation by the load upon the propeller shaft 31.

The driver then grasps the handle 76 and operates it to shift the collar 73 into the position of Fig. 1, enabling the leaf spring 60 to shift the ratchet slide 58 into contact with the ratchet slide 66. The slide 66 is reciprocated once for each differential revolution of the discs 43 and 48. Each time the slide 66 moves inwardly it pulls the slide 58 inwardly one notch, and the latter ratchets over the teeth on the boss 59 and snaps back into contact with those teeth, being held there while the slide 66 again travels outwardly. In this latter operation the slide 66 ratchets over the teeth on the slide 58. The brake shoes 51 are thereby applied gradually, and there is communicated from the more rapidly moving disc 43 to the more slowly moving disc 48 a braking or clutching effort tending to increase the speed of rotation of the disc 48 and to reduce the speed of rotation of the disc 43. This cannot take place if the disc 33 and the cluster gears remain stationary. Consequently the cluster gears begin to revolve slowly and to transmit torque through the disc 33 to the propeller shaft 31. In the meantime the slides 66 and 58 are continuing to function and the brake is being set a little more tightly, tending to still further lessen the speed differential between the two discs 43 and 48, which causes the cluster gears to revolve with their disc 33 more rapidly.

The vehicle being in motion, and its speed gradually accelerating as will be the case on a smooth level pavement, the drag on the brake decreases and the slippage correspondingly decreases, so that the increasing speed of the vehicle works with the ratchet slides 66 and 58 to arrive quickly at a firm gripping of the brake and a locking of the two discs 44 and 48 together. When this occurs there can be no movement of the clusters relative to either of the discs 44 and 48, and if the clusters cannot move upon either one of the gears 40 and 45 they cannot turn at all and hence cannot move upon gear 35. The whole transmission therefore revolves together at engine shaft speed. In other words, the drive is direct. At such times there is no relative movement between the eccentric 71 and the ring 70, and consequently no reciprocation of slide 66.

When the vehicle is traveling through sand or the like or up a hill, acceleration will be slower and brake slippage greater, so that a somewhat longer period may be required in order to arrive at direct drive. When direct drive has been reached the operator may cause the collar 73 to move forward from the position shown in Fig. 1, pulling upon the rod 68 and drawing the ratchet slide 66 out of contact with the slide 58. Thereafter, if there should be any especially heavy load placed upon the propeller shaft 31 momentarily, causing slippage of the brake, the consequent reciprocation of the slide 66, caused by the relative rotation of the two discs 43 and 48, will not be communicated to the slide 58. If the grade is too steep or the load too heavy to permit the use of direct drive, the operator may withdraw the slide 66 from contact with the slide 58 before the brake is fully set. Slippage between the discs 43 and 48 will then continue, and a gear below high gear will be maintained. For this purpose any one of a considerable number of ratios may be selected, the number depending upon the number of teeth in the ratchet mechanism.

When the driver desires to stop the vehicle, he causes the collar 73 to move rearwardly beyond the position illustrated in Fig. 1. The plate 65 then acting against the heads 64 upon rod 63 pushes the rod 61 rearwardly, disengaging the slide 58 from contact with the teeth on the boss 59, whereupon the brake operating lever 53 is permitted to rise to the position of Fig. 2. The transmission is then in neutral, and although the slide 66 is reciprocating its motion is not communicated to the slide 58.

Assuming that the vehicle is standing still, with the slide 58 thrown back of operative position, and the operator desires to use reverse gear, he then operates lever 25 to throw out the main clutch and shifts handle 84 to depress dog 78 and lock disc 43 against movement. After the main clutch has been let in again, the cluster gears immediately travel in a reverse direction around the gear 40, thereby revolving the disc 43 and the propeller shaft 31 in the proper direction.

Under unusual conditions where an absolutely positive drive at low speed in a forward direction is desired, the operator causes the dog 79 to be depressed into locking engagement with the teeth on the disc 48, the main clutch being operated to permit the shift, as in the conventional transmission. The disc 48 is thereby held stationary and the cluster gears are caused to revolve about the gear 45, but this time in the proper direction to impart forward motion to the disc 43 and propeller shaft 31.

While in the foregoing specification and in the accompanying drawings I have disclosed somewhat in detail one particular embodiment of the invention, I desire it to be understood that such detail disclosure has been resorted to primarily for the purpose of fully illustrating the invention in accordance with the provisions of the statute, and that the invention is not to be construed as limited in this respect except as it may be defined in the accompanying claims.

Having thus described my invention what I claim is:

1. In a transmission, a driven element, a triple cluster gear eccentrically mounted thereon, a drive shaft, a driving gear carried thereby and meshing with one gear of said cluster, a pair of independent gears surrounding said shaft, rotatable with respect thereto and meshing with the two remaining gears of said cluster, and means adapted to be operated by the relative rotation of said independent gears for frictionally clutching them together.

2. In a transmission, a driven element, a triple cluster gear eccentrically mounted thereon, a drive shaft, a driving gear carried thereby and meshing with one gear of said cluster, a pair of independent gears surrounding said shaft, rotatable with respect thereto and meshing with the two remaining gears of said cluster, and manually controlled means adapted to be operated by the relative rotation of said independent gears for frictionally clutching them together.

3. In a transmission, a driven element, a triple cluster gear eccentrically mounted thereon, a drive shaft, a driving gear carried thereby and meshing with one gear of said cluster, a pair of independent gears surrounding said shaft, rotatable with respect thereto and meshing with the two remaining gears of said cluster, and means adapted to be operated by the relative rotation of said independent gears for exerting gradually increasing clutching effort tending to bring said independent gears to a common speed, said clutching effort finally locking said independent gears together against relative rotation, whereby thre entire transmission revolves with said driving gear to impart direct drive.

4. In a transmission, a driven element, a triple cluster gear eccentrically mounted thereon, a drive shaft, a driving gear mounted thereon meshing with one gear of said cluster, a pair of concentric sleeves surrounding said shaft and rotatable independently of the shaft and of each other, a gear carried by each of said sleeves and meshing with one of the two remaining gears of said cluster, and means adapted to be operated by the relative rotation of said sleeves for frictionally clutching the sleeves together.

5. In a transmission, a driven element, a triple cluster gear eccentrically mounted thereon, a drive shaft, a driving gear mounted thereon meshing with one gear of said cluster, a pair of concentric sleeves surrounding said shaft and rotatable independently of the shaft and of each other, a gear carried by each of said sleeves and meshing with one of the two remaining gears of said cluster, and manually controlled means adapted to be operated by the relative rotation of said sleeves for frictionally clutching the sleeves together.

6. In a transmission, a driven element, a triple cluster gear eccentrically mounted thereon, a drive shaft, a driving gear carried thereby and meshing with one gear of said cluster, a pair of independent gears surrounding said shaft, rotatable with respect thereto and meshing with the two remaining gears of said cluster, means adapted to be operated by the relative rotation of said independent gears for frictionally clutching them together, and means operable when said clutch is out for locking either of said independent gears against rotation.

7. In a transmission, a driven element, a triple cluster gear eccentrically mounted thereon, a drive shaft, a driving gear carried thereby and meshing with one gear of said cluster, a pair of independent gears surrounding said shaft, rotatable with respect thereto and meshing with the two remaining gears of said cluster, and means adapted to be operated step by step by the relative rotation of said independent gears for frictionally clutching them together.

8. In a transmission, a driven element, a triple cluster gear eccentrically mounted thereon, a drive shaft, a driving gear mounted thereon and meshing with one gear of said cluster, a pair of concentric sleeves surrounding said shaft and rotatable independently of the shaft and of each other, a disc carried by each of said sleeves, a gear carried by each of said sleeves meshing with one of the two remaining gears of said cluster, and means carried partly by each of said discs adapted to be operated by the relative rotation of the discs for frictionally clutching them together.

9. In a transmission, a driven element, a triple cluster gear eccentrically mounted thereon, a drive shaft, a driving gear mounted thereon and meshing with one gear of said cluster, a pair of concentric sleeves surrounding said shaft and rotatable independently of the shaft and of each other, a disc carried by each of said sleeves, a gear carried by each of said sleeves meshing with one of the two remaining gears of said cluster, and means carried partly by each of said discs adapted to be operated by the relative rotation of the discs for frictionally clutching them together step by step at a rate dependent upon and varying with the differential speed of the discs.

10. In a transmission, a driven element, a triple cluster gear eccentrically mounted thereon, a drive shaft, a driving gear mounted thereon and meshing with one gear of said cluster, a pair of concentric sleeves surrounding said shaft and rotatable independently of the shaft and of each other, a disc carried by each of said sleeves, a gear carried by each of said sleeves meshing with one of the two remaining gears of said cluster, and manually controlled means carried partly by each of said last named discs adapted to be operated by the relative rotation of the discs for frictionally clutching them together.

11. In a transmission, a driven element, a triple cluster gear eccentrically mounted thereon, a drive shaft, a driving gear mounted thereon meshing with one gear of said cluster, a pair of concentric sleeves surrounding said shaft and rotatable independently of the shaft and of each other, a gear carried by each of said sleeves and meshing with one of the two remaining gears of said cluster, an eccentric carried by one of said sleeves, and means operatively associated with said eccentric and carried by the other sleeve for frictionally clutching said sleeves together step by step.

12. In a transmission, a driven element, a triple cluster gear eccentrically mounted thereon, a drive shaft, a driving gear mounted thereon meshing with one gear of said cluster, a pair of concentric sleeves surrounding said shaft and rotatable independently of the shaft and of each other, a gear carried by each of said sleeves and meshing with one of the two remaining gears of said cluster, a friction clutch operatively associated with said sleeves, operating mechanism for said clutch adapted to apply the clutch step by step, and means responsive to relative rotation between said sleeves for operating said mechanism.

13. In a transmission, a driven element, a triple cluster gear eccentrically mounted thereon, a drive shaft, a driving gear carried thereby and meshing with one gear of said cluster, a pair of independent gears surrounding said shaft, rotatable with respect thereto and meshing with the two remaining gears of said cluster, means adapted to be operated by the relative rotation of said independent gears for frictionally clutching them together, and means for interrupting the action of said last named means before the clutch is tightly set.

14. In a transmission, a driven element, a triple cluster gear eccentrically mounted thereon, a drive shaft, a driving gear carried thereby and meshing with one gear of said cluster, a pair of independent gears surrounding said shaft, rotatable with respect thereto and meshing with the two remaining gears of said cluster, means adapted to be operated by the relative rotation of said independent gears for frictionally clutching them together, and manually operable means for disabling said last named means.

In testimony whereof, I hereunto affix my signature.

WILLIAM H. SINGLETON.